Figure 1:
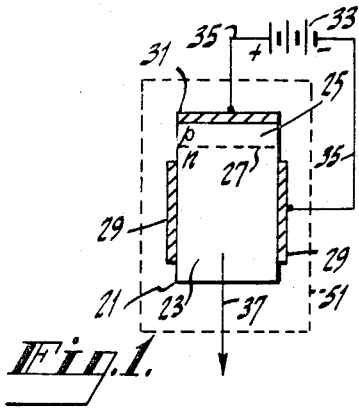

Nov. 21, 1967          Z. J. KISS          3,354,406

ELEMENT AND APPARATUS FOR GENERATING COHERENT RADIATION

Filed April 22, 1963

INVENTOR.
ZOLTAN J. KISS
BY
W.S. Hiel
AGENT

United States Patent Office 3,354,406
Patented Nov. 21, 1967

3,354,406
ELEMENT AND APPARATUS FOR GENERATING COHERENT RADIATION
Zoltan J. Kiss, Trenton, N.J., assignor to Radio Corporation of America, a corporation of Delaware
Filed Apr. 22, 1963, Ser. No. 274,652
5 Claims. (Cl. 331—94.5)

This invention relates to a novel element and apparatus for generating coherent radiation by stimulated emission of luminescent cations. The invention is directed particularly to that type of apparatus where the active element is electrically-pumped which, in one form, is commonly referred to as an injection laser.

One type of injection laser, as previously described, comprises a body of semiconductor material having a p-n junction therein. When the junction is forward biased, charge carriers move across the junction and, at least a portion, recombine radiatively with charge carriers of the other type. Under suitable conditions, the radiative emission may be both stimulated and coherent. In one suggested form, the emission results from radiative valence band-to-conduction band transitions of carriers in the semiconductor. In a modified form, the emission results from radiative transitions of carriers to or from energy states in the bandgap of the semiconductor. Such states result, for example, from conductivity-type determining impurities which are present in the semiconductor.

Previous injection lasers have the convenience of direct and efficient electrical pumping through the injection of minority carriers. However, they have the disadvantages of (1) having the recombination take place in a small volume of emitting material in or close to the junction; (2) having relatively broad emission lines resulting from radiative transitions which are relatively closely coupled to the energy bands of the semiconductor; (3) having severe cooling problems, especially for continuous wave operaton, because the losses (which manifest themselves as heat) are concentrated in a small volume, and (4) having large nonsymmetrical beam divergence due to the diffraction limit of a small area of active media.

An object of this invention is to provide an improved electrically pumped laser apparatus and a novel laser element therefor.

Another object is to provide an injection laser apparatus and element therefor which retains the pumping advantages and overcomes the above-cited disadvantages of previous injection laser apparatus.

The novel element of the invention comprises a semiconductor body having an energy bandgap of at least 1.4 electron volts, means for introducing electrons into the body, and separate means for introducing holes into the body within about a diffusion length of the introduced electrons. The semiconductor body (at least in a portion operatively associated with the region into which the carriers are injected) contains cations which exhibit radiative transitions entirely between levels of the bound electrons in the cations. Levels of bound electrons are those levels of orbital electrons entirely in the cation with energies below the ionization level in the cation. The preferred cations are nonradioactive lanthanides, such as neodymium and samarium; and nonradioactive actinides, such as uranium. The preferred transitions are between levels in the unfilled $4f$ configuration in the lanthanides, and between levels in the unfilled $5f$ configuration in the actinides, such as uranium. The preferred transitions are between levels in the unfilled $4f$ configuration in the lanthanides, and between levels in the unfilled $5f$ configuration in the actinides. These cations may be excited, directly or indirectly, to emit radiation by the injection of minority carriers into the semiconductor body. In a preferred form, the element comprises a body of a III-V compound having a p-n junction therein, and containing the above-mentioned cations. The apparatus of the invention comprises an element of the invention and circuit means operatively connected to cause electrons and holes to be introduced into the semiconductor within a diffusion length of one another.

The foregoing structure has the advantages of electrical pumping as in previous apparatus, and the emission characteristics of luminescent cations. The structure may be tailored to provide coherent emission with a narrower band width at a desired portion of the spectrum, and different from that of the bandgap emission of the semiconductor. The element is also more efficient and may operate at higher power levels than previous injection lasers because the coherent emission results from energy transitions in the cations which are distributed in a larger volume of material. The emission may be improved in brightness and beam divergence by shaping the emitting volume to form an optical resonator, such as a Fabry-Perot resonator.

A more complete description of the invention together with illustrative embodiments thereof appears below in conjunction with the drawing in which:

FIGURE 1 is a sectional view of a first embodiment of the invention wherein coherent light is emitted from the semiconductor body in a direction normal to the junction in the body.

Figure 2:
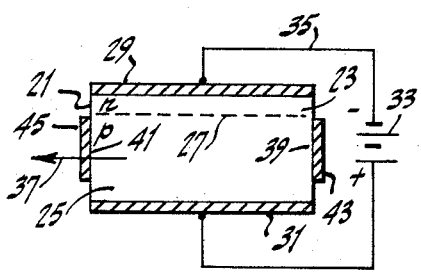
Figure 3:
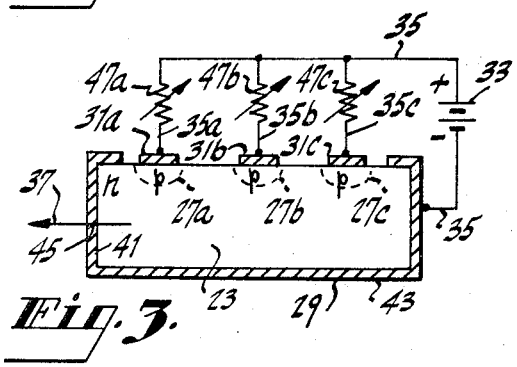
Figure 4:
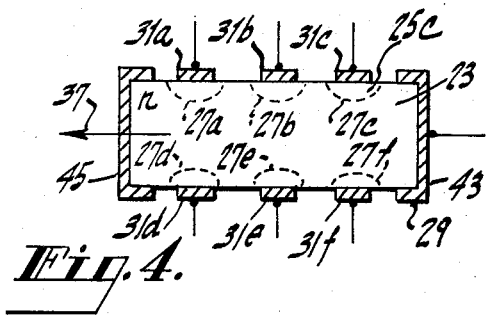
Figure 5:
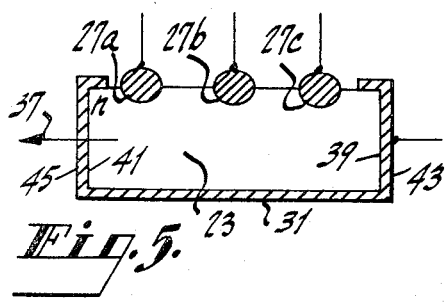
Figure 6:
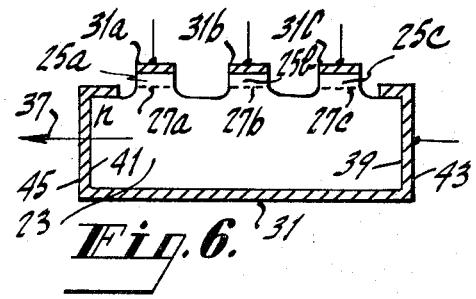
Figure 7:
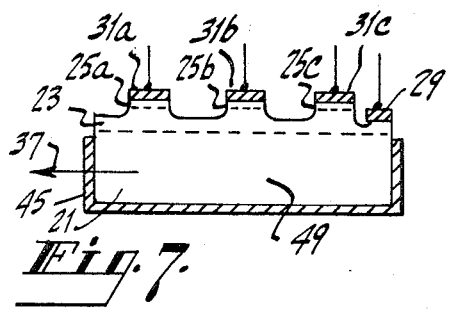

FIGURE 2 is a sectional view of a second embodiment wherein coherent light is emitted from the semiconductor body substantially parallel to the junction in the body, FIGURE 3 is a sectional view of a third embodiment of the invention including a plurality of junctions in a single line in a planar-type structure, FIGURE 4 is a sectional view of a fourth embodiment of the invention employing a plurality of junctions in more than one row in a planar-type structure, FIGURE 5 is a sectional view of a fifth embodiment of the invention employing a plurality of alloyed junctions in the semiconductor body, FIGURE 6 is a sectional view of a sixth embodiment of the invention employing a plurality of junctions in a mesa-type structure, and FIGURE 7 is a sectional view of a seventh embodiment of the invention similar to that of FIGURE 6 except that the region containing the luminescent cations is separated from the conductivity zones adjacent the junction.

Similar reference numerals are used for similar elements throughout the drawing.

The first embodiment, illustrated in FIGURE 1, comprises a semiconductor body 21 having an n-type region 23 and a p-type region 25 which are contiguous and define a p-n junction 27 therebetween. The body 21 is in the shape of a right cylinder, although other body shapes may be used. The junction 27 is normal to the cylinder axis, but this is not critical. A pair of low resistance connections 29 and 31 contact n- and p-type regions 23 and 25 respectively. The connection 29 extends completely around the n-type region 23.

The semiconductor body 21 may be of any semiconductor material having an energy bandgap (between the valence band and the conduction band) greater than 1.4 electron volts. The III–V compounds, such as gallium arsenide and gallium phosphide are preferred. Other semiconductors, such as zinc sulfide and calcium fluoride may be used. A relatively wide bandgap is preferred (1) so that each injection carried has a correspondingly higher available energy, (2) so that the coherent emission frequencies may be tailored to have shorter wavelengths and (3) so that there are lower nonradiative losses. However, it is usually more difficult to make suitable junctions and low resistance contacts to a semiconductor material having a wide bandgap. Thus, the semiconductor material is selected both on structural and technological factors.

The semiconductor body 21 is doped with suitable conductivity-type-determining impurities to impart contiguous regions of opposite conductivity type. By contiguous is meant that the transition between the p-type and n-type regions is not more than about a diffusion length for minority charge carriers in the semiconductor. The transition may be graded uniformly or nonuniformly. For example, the transition region may have an intrinsic region of finite length therein. In the case of III–V compounds, n-type regions may be obtained with elements from group 6, such as sulfur, selenium and tellurium; and p-type regions are produced with elements from group 2, such as zinc and cadmium. The purpose of the contiguous regions is to provide a p-n junction which is a convenient structure for injecting charge carriers into a region of a semiconductor. The conductivity-type-determining impurities are preferably one which do not interfere with and do not degrade the emission processes.

One of the regions (the n-type region 23 in the first embodiment), contains activator proportions of luminescent cations which exhibit radiative transitions entirely between levels of bound electrons in the cations. Ordinarily, in a semiconductor body, the radiative energy transitions are between the outer filled shell, or valence band, of the semiconductor and the next shell, or conduction band, which is the ionization level of the material. Impurities suggested in the prior art modify these transitions between the bands by providing states in the bandgap between the valence and conduction bands from and/or to which electrons or holes may pass. Such transitions are between levels which are closely coupled to the energy bands of the semiconductor.

The luminescent cations contained in the semiconductor body use radiative transitions entirely between levels of orbital electrons with energies below the ionization level in the cation. The transitions are not closely coupled to the valence and conduction bands of the semiconductor. In particular, the spin orbit parameter is substantially independent of the semiconductor. These transitions are well screened from the crystal field of the semiconductor. As a result, these transitions are only slightly affected by changes in or substitutions of the semiconductor. Some cations which satisfy the foregoing definition are the non-radioactive lanthanides and actinides. Some examples of suitable luminescent cations are cations of: Pr, Nd, Sm, Eu, Gd, Tb, Ho, Er, Tm, Yb and U. The luminescent cations are preferably in the trivalent state, although they may be in other valence states. The preferred transitions are between levels in the unfilled $4f$ configuration in the lanthanides, and between levels in the $5f$ configuration in the actinides. The selection of particular cations and host material (semiconductor) depends upon the application intended for the apparatus. Some preferred combinations, the states into which energy is absorbed, the states for the emissive transitions, and the emissive wavelength are:

| Combination | Absorption | Emission Transition | Emission Wavelength $\mu$ |
|---|---|---|---|
| GaAs: $Nd^{3+}$ | $^4F$ | $^4F \rightarrow {}^4I_{11/2}$ | 1.05 |
| GaAs: $Ho^{3+}$ | $^5I_5$ | $^5I_7 \rightarrow {}^5I_8$ | 1.95 |
| GaAs: $Tm^{3+}$ | $^3F_4$ | $^3H_5 \rightarrow {}^3H_6$ | 1.90 |
| GaAs: $Er^{3+}$ | $^4I_{9/2}$ | $^4I_{13/2} \rightarrow {}^4I_{15/2}$ | 1.50 |
| GaP: $Sm^{3+}$ | $^4F_{5/2}$ | $^4F_{5/2} \rightarrow {}^4H$ | 0.6 |

Combinations of two or more cations may be used. The luminescent cations which provide the radiative transitions are present in proportions of about 0.0001 to 0.01 mol of cation per mol of semiconductor. The luminescent cations are preferably uniformly distributed throughout the semiconductor although they may also be distributed nonuniformly. The luminescent cations may be contained in a conductivity region defining a junction, or in the junction, or in a separate region of the semiconductor, or in a combination thereof.

The embodiment of FIGURE 1 includes also a circuit comprising a source of DC voltage 33 connected to the electrodes 29 and 31 by leads 35. The circuit may include also (but not shown) means for disconnecting the voltage source 33 and means for controlling the voltage applied to the electrodes 29 and 31 and the current passing through the circuit. The body 21 is contained in a cryostat or other means 51 for maintaining the body at a desired temperature. In some embodiments, the body 21 is maintained at the temperature of a liquid gas; for example that of liquid nitrogen or liquid neon at atmospheric pressure. The cryostat 51 may be omitted in embodiments where the element may be operated at room temperature. Coherent light is emitted from the n-type region 23 as indicated by the arrow 37.

The exact process by which the energy of the injected carriers is converted to photon energy from transitions in the luminescent cations is not known. According to one explanation, the injected carriers recombine radiatively across the bandgap in the semiconductor. The recombination radiation is then absorbed by luminescent cations inside the semiconductor body, which then re-emit the energy at the frequencies of the energy transition of the cations. This re-emission is the result of an indirect excitation mechanism. According to another explanation, the injected carriers produce phonons, or other nonradiative energy forms, which in turn excite the luminescent cations to emit photons. This photon emission is due to a direct excitation mechanism. According to still another explanation, wherein the photon energy emitted is also due to a direct excitation mechanism, the luminescent cations have associated with them, trapping sites for injected carriers. This may be achieved when the luminescent cations are either acceptors or donors in the semiconductor; or when the absorption transitions are in the bandgap of the luminescent cation. In any of these structures the injected carriers are attracted to the trapping sites where they recombine, transferring energy toward exciting the cations to luminesce. A consequence of this explanation is a preference that the injected carriers have a relatively long lifetime and a relatively large diffusion length in the semiconductor. Each of the explanations is adequate to explain why the output of the device is coherent radiation in different portions of the spectrum and in narrower bands of wavelengths than in previous injection lasers.

There are many variations of the invention. Injection may be either of holes into an n-type region as illustrated in FIGURE 1, or of electrons into a p-type region as illustrated in FIGURE 2, or of both holes and electrons into an intrinsic or junction region. In either case the junction 27 is biased in the forward direction. Also, as pointed out above, one may inject both electrons and holes into an intrinsic region where the recombination may take place.

The element of the invention may be pumped with combinations of electrical and radiant energies. For example, in some cases, the element may be pumped by injection of free charge carriers as described above plus (a) photon absorption; that is, by irradiation with light which is absorbed by the cations and/or (b) energy particle bombardment; that is, by irradiation with cathode ray beams; and/or photoconductive absorption; that is, by irradiation with light that is absorbed by the semiconductor to produce electron-hole pairs.

The semiconductor body 21 is preferably in the form of an optically resonant structure. The second embodiment, illustrated in FIGURE 2, comprises a structure similar to that of FIGURE 1. As shown in FIGURE 2 the body 21 is a rectangular wafer. The end faces 39 and 41 of the body 21 are plane and parallel. One end face 39 is made totally reflecting by a relatively thick coating 43 of a metal, such as aluminum. The other end face is made about 90% reflecting and about 10% transmitting by a thinner coating 45 of metal. Thus, the end faces and the semiconductor body comprise a Fabry-Perot resonator whereby much of the emitted light makes many passes between the end faces 39 and 41 before it emerges from the body 21.

The third embodiment, shown in FIGURE 3, is similar to that of FIGURE 2. However, the functions of the one electrode 31 and the reflecting coatings 43 and 45 in FIGURE 2 are combined in a single coating in FIGURE 3 having portions for each of these functions. Also, there are a plurality of junctions 27a, 27b, and 27c for injecting minority carriers into the n-type zone 23. As shown in FIGURE 3, the junctions (which may be produced by diffusion of a p-type impurity into selected areas of the surface of an n-type body) are arranged in a planar-type-structure. All of the junctions are in a single row. All of the junctions have a common n-type region 23 and a separate p-type region. Each p-type region is separately biased through parallel branches 35a, 35b, and 35c of the lead 35. The branches include variable resistors 47a, 47b, and 47c respectively for separately adjusting the relative bias on each junction.

In an element having several junctions, the junctions may be separately biased. This may be used, for example, so that, the element does not emit coherent light with one junction biased "on" but will emit coherent light with two or more junctions biased "on." This can be used as an "and" gate. Other combinations of junctions and bias conditions can be provided to use the threshold for producing coherent emission.

The fourth embodiment shown in FIGURE 4 is similar to that of FIGURE 3. However, there is a plurality of junctions, 27a to 27f, in two opposed rows in the semiconductor body 21. There may be more than two rows each with more or less than three junctions in each row. Also, the junctions may be positioned in other arrangements than rows or randomly on the semiconductor body 21.

The fifth embodiment, shown in FIGURE 5, is similar to that of FIGURE 3 except that the junctions 27a, 27b and 27c are produced by alloying. Alloyed junctions may be prepared by relatively cheap and easily controlled method of fabrication.

The sixth embodiment shown in FIGURE 6 is similar to that of FIGURE 3 except that the junctions 27a, 27b and 27c (which may be produced by diffusion and etching) are arranged in a mesa-type structure. Such junctions and structures are used where precision spacing and size of junctions are required.

The seventh embodiment shown in FIGURE 7 is similar to that of FIGURE 6 except that the luminescent cations are in a region 49 of the semiconductor body 21 separate from the n-type and p-type regions 23 and 25. Such a structure may be conveniently made by preparing the semiconductor containing the luminescent cations and then producing one and then the other conductivity zone to the desired depth, as by successive diffusions of impurities.

*Example 1*

A device having the structure of FIGURE 2 but having an n-type base region 23 and a p-type skin 25 may be prepared by the following process. Start with a single crystal wafer 21 of n-type gallium arsenide containing about $10^{17}$ atoms of sulfur per cc. and about 0.001 mol neodymium ($Nd^3$) per mol gallium arsenide. The wafer is rectangular with dimensions of about 1.0 by 0.25 by 0.025 inch. Heat the wafer for about 1 hour at about 900° C. in an atmosphere containing zinc vapor. Continue the heating until the zinc diffuses into the surface of the wafer to a depth of about 1 mil and produces a p-type skin 25 in the wafer. Mask one of the major surfaces with a resist and etch the remaining surfaces to remove the zinc-diffused p-type skin from the unmasked areas. Now, grind the two minor surfaces 39 and 41 to be plane and parallel with respect to one another. Next, evaporate gold metal 31 upon the major surface of the n-type base region 25 opposite the masked surface to produce an ohmic contact thereto. Then, remove the resist and evaporate nickel metal 29 upon the surface of the p-type skin 25 to produce an ohmic contact thereto. Finally, evaporate aluminum metal of suitable thickness upon the minor surfaces of the p-type region to produce the reflectors 43 and 45 with the desired reflection and transmission characteristics. The device of this example may be operated at liquid nitrogen temperature (77° K.) by applying a voltage which produces a current density through the junction of between 1 and $10^5$ amperes per square centimeter. Coherent emission having a wavelength of about 1.06 microns is observed as a beam 37.

*Example 2*

A device having the structure of FIGURE 6 may be prepared by the following process. Start with a single crystal wafer 21 of n-type gallium arsenide containing about $10^{17}$ atoms sulfur per cc. and about 0.005 mol holmium ($Ho^{3+}$) per mol gallium arsenide. The wafer 21 is a right cylinder with dimensions of about 0.25 inch in diameter and about 1.25 inches long. Heat the wafer for about 1 hour at about 900° C. in an atmosphere containing zinc vapor. Continue the heating until zinc diffuses into the surface of the wafer to a depth about 1 mil and produces a p-type skin 25 in the wafer 21. A portion of the circular surface, where the junctions are to be, is masked with a resist and the remaining surfaces etched to remove the zinc-diffused p-type skin from the unmasked areas. Grind the two end surfaces 39 and 41 to be plane and parallel with respect to one another. Next, evaporate gold metal 31 upon the surface of the n-type base region 23. Then, remove the resist from the surface of the p-type regions 25a, 25b, 25c. Evaporate nickel metal 31a, 31b, 31c upon the surfaces of the p-type skin 25a, 25b, 25c to produce ohmic contacts thereto. Next evaporate tin metal 43 and 45 over the remaining surfaces of the wafer 21 being careful not to extend the tin metal into contact with the previously evaporated nickel metal 31a, 31b, 31c. Control the thickness of the tin metal on the end faces to produce the desired reflection and transmission characteristics.

What is claimed is:

1. In a device of the class for generating radiation wherein said device comprises a semiconductor body having contiguous p-type and n-type regions forming a p-n junction therebetween, the improvement comprising nonradioactive cations selected from the group consisting of lanthanides and actinides in at least one of said regions, whereby carriers may be injected through said junction into said one of said regions when said junction is forward biased, causing said cations to luminesce.

2. A device of the class for generating radiation as defined in claim 1, wherein said semiconductor body comprises a III–V compound selected from the group consisting of gallium arsenide, gallium phosphide, aluminum phosphide, and boron nitride.

3. A device of the class for generating radiation as defined in claim 1, wherein said semiconductor body comprises a III–V compound, and said nonradioactive cations are selected from the group consisting of Pr, Nd, Sm, Eu, Gd, Tb, Ty, Ho, Er, Tm, and Yb.

4. In apparatus of the class for generating radiation comprising a body of semiconductor material having a relatively large region of one type conductivity, said body being formed with a plurality of mesas, a relatively smaller region of opposite type conductivity to said one type conductivity in each of said mesas forming a separate p-n junction with said region of one type conductivity in each of said mesas, and means to apply a voltage across each of said p-n junctions to bias them in a forward direction, the improvement comprising nonradioactive cations selected from the group consisting of lanthanides and actinides in at least one of said regions, whereby carriers may be injected through said p-n junctions into said one of said regions when said p-n junctions are forward biased, causing said cations to luminesce.

5. Apparatus of the class for generating radiation as defined in claim 4, wherein said semiconductor body comprises a III–V compound and said cations are selected from the group consisting of Pr, Nd, Sm, Eu, Gd, Tb, Dy, Ho, Er, Tm, and Yb.

References Cited

UNITED STATES PATENTS 3,245,002  4/1966  Hall _____ 331—94.5

OTHER REFERENCES

Galkin et al.: The Luminescence of Trivalent Uranium. Soviet Physics, Doklady, vol. 2 (1957), pp. 255–257.

JEWELL H. PEDERSEN, *Primary Examiner.*

W. L. SIKES, *Assistant Examiner.*